United States Patent [19]

Kitagawa et al.

[11] Patent Number: 4,520,359

[45] Date of Patent: May 28, 1985

[54] CURRENT FREQUENCY WAVEFORM TRANSMITTING ON D.C. POWER LINES

[75] Inventors: Junji Kitagawa; Shigeyuki Akita, both of Okazaki; Sotoo Kitamura, Aichi, all of Japan

[73] Assignee: Nippon Soken, Inc., Nishio, Japan

[21] Appl. No.: 386,511

[22] Filed: Jun. 9, 1982

[30] Foreign Application Priority Data

Jun. 12, 1981 [JP] Japan .............................. 56-86994[U]

[51] Int. Cl.³ .................... G08C 19/16; G08C 19/20; G08C 19/12
[52] U.S. Cl. .............................. 340/870.19; 73/304 R; 340/59; 340/870.26
[58] Field of Search ................ 340/310 R, 59, 870.19, 340/870.2, 870.22, 870,23, 870,24, 870.26; 73/304 R; 324/208

[56] References Cited

U.S. PATENT DOCUMENTS

| | | | |
|---|---|---|---|
| 2,477,370 | 7/1949 | Hana | 340/870.24 |
| 2,883,650 | 4/1959 | Brockway | 340/870.24 |
| 3,006,713 | 10/1961 | Klein | 340/870.24 |
| 3,339,193 | 8/1967 | Epstein | 340/870.19 |
| 3,417,337 | 12/1968 | Prasil | 340/870.24 |
| 3,417,390 | 12/1968 | Turtle | 340/870.19 |
| 3,721,830 | 3/1973 | Oishi | 340/310 R |
| 3,818,466 | 6/1974 | Honda | 340/310 R |
| 4,164,146 | 8/1979 | Duvall | 73/304 R |
| 4,164,706 | 9/1979 | Akita et al. | 324/208 |

Primary Examiner—James J. Groody
Attorney, Agent, or Firm—Cushman, Darby & Cushman

[57] ABSTRACT

A frequency transmission system comprises a pulse train generator and a signal converter. The pulse train generator generates a pulse signal of a sufficiently short duration in response to oscillation frequency signals, and the signal converter circuit converts the pulse signal into a current signal and blunts the waveform of the converted signal by a capacitor to transmit through power supply lines.

3 Claims, 4 Drawing Figures

CURRENT FREQUENCY WAVEFORM TRANSMITTING ON D.C. POWER LINES

BACKGROUND OF THE INVENTION

The present invention relates to a frequency-signal transmission system for transmitting an oscillation frequency-signal through power supply lines such as the power supply line and an earth line, such as a frequency-signal transmission system used for an oil level sensor of an automotive vehicle.

In conventional transmission system for such an oscillation frequency-signal, an oscillation frequency-signal from an oscillator section is directly converted into a current and transmitted by a power supply line and an earth line.

When the oscillation frequency-signal is converted into a current signal of sufficiently large current variations and superimposed on power current flowing through the power supply line, the voltage value to be supplied to the oscillator section is undesirably reduced. If the current variations of the converted frequency-signal are reduced in order not to reduce the voltage value supplied to the oscillator section, on the other hand, an external noise or the like causes an operating error. Another disadvantage of the conventional system is that higher harmonics are generated by switching of the oscillation frequency-signal, thereby producing noises in a radio set or computer in the systems mounted on the vehicle.

SUMMARY OF THE INVENTION

Accordingly, it is an object of the present invention to provide a frequency-signal transmission system comprising a one-shot multivibrator circuit for generating a pulse signal with a sufficiently short pulse duration as compared with the oscillation frequency signal of the oscillator section, and a current converter circuit for converting the signal of the one-shot multivibrator circuit into a signal representing a current variation and for waveform-shaping or blunting the wave form of the same signal by a capacitor for superimposition on power current flowing through the power supply lines, so that the current line can be provided with a sufficient current variation and the oscillation frequency-signal is transmitted without decreasing the voltage supplied to the oscillator section or without generating the higher harmonics which otherwise might be caused by the signal.

DESCRIPTION OF THE PREFERRED EMBODIMENTS

Figure 1:
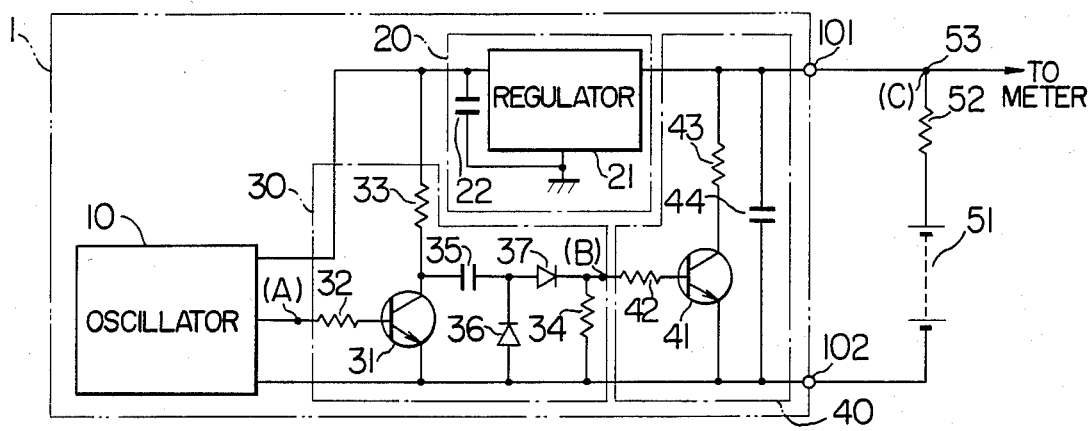
FIG. 1 is an electrical wiring diagram showing an embodiment of the system according to the present invention.

An embodiment of the present invention shown in the drawings will be described. First, in the electrical wiring diagram of FIG. 1 showing a general configuration of the system according to the present invention, numeral 51 designates a battery for supplying electric power, and numeral 52 a current detecting resistor. Numeral 101 designates a power terminal for a signal producing package 1, which power terminal is connected to a resistor 52. Numeral 102 designates a grounding terminal connected to the earth of the battery 51. Numeral 10 designates an oscillator section for generating an oscillation frequency-signal having a frequency changing with a physical quantity such as pressure applied thereto. The oscillator section 10 is used, for example, as an oil level sensor for an automotive vehicle and changes in frequency in accordance with the oil level. Numeral 20 designates a constant-voltage circuit including a regulator 21 (such as MC7805 of Motorola INC.) and a capacitor 22 for generating a constant voltage regardless of the voltage change of the power supply line. Numeral 30 designates a one-shot multivibrator circuit including a transistor 31, resistors 32, 33 and 34, capacitor 35 and diodes 36 and 37 for generating a pulse signal sufficiently short in pulse duration as compared with that of the oscillation frequency-signal generated by the oscillator section 10. Numeral 40 designates a current converter circuit including a transistor 41, resistors 42, 43 and capacitor 44. The signal from the one-shot multivibrator 30 is superimposed on power current of the power line as a change of current and transmitted through the terminal 101 to be detected as a voltage change at an end 53 of the resistor 52.

Figure 2:
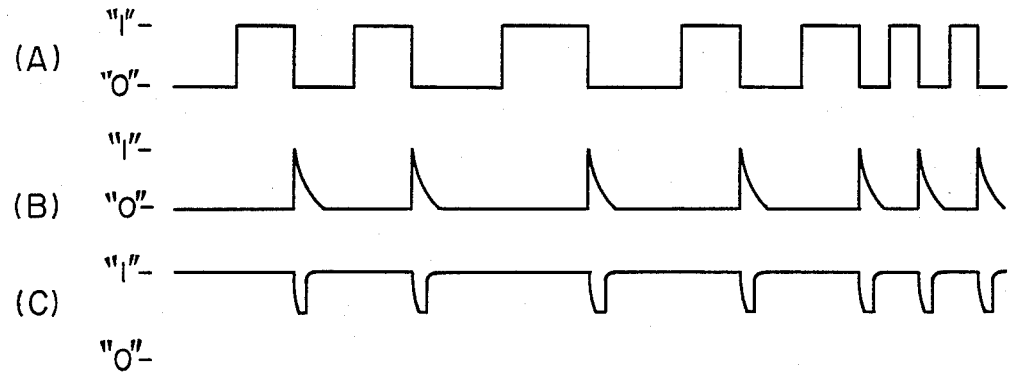
FIG. 2 shows voltage waveforms produced at various parts of the circuit shown in FIG. 1.

The operation of the system having the above-mentioned configuration will be explained with reference to the voltage waveform diagram of FIG. 2. First, an oscillation frequency-signal having a changing frequency is generated from the oscillator section 10 as shown in the waveform (A) of FIG. 2. This signal is applied to the one-shot multivibrator circuit 30 thereby to produce at the output terminal of the one-shot multivibrator circuit 30 a pulse signal having a short pulse duration as shown in the waveform (B) of FIG. 2 determined by the time constant due to the resistor 33 and the capacitor 35 through the transistor 31. The signal (B) of FIG. 2 is applied to the current converter circuit 40 and is introduced into the power line as a change of current value by the transistor 41. At the same time, the waveform of the signal is blunted by the capacitor 44 to produce an output signal at the power terminal 101. Since a current is supplied from the battery 51 as required, a signal of the same frequency as the signal (A) of FIG. 2 is produced at the terminal 53 of the current-detecting resistor 52 as shown in the waveform (C) of FIG. 2. And the signal of the waveform (C) is transmitted from the terminal 53 through the power supply line to an indicating meter.

In the case where this system is mounted on an automotive vehicle, the resistor 43 may have a resistance value of say several hundred ohms and the capacitor 44 may have the value of 1 to 10 μF thereby to transmit a frequency of several tens of KHz. These data may be changed as required.

Figure 3:
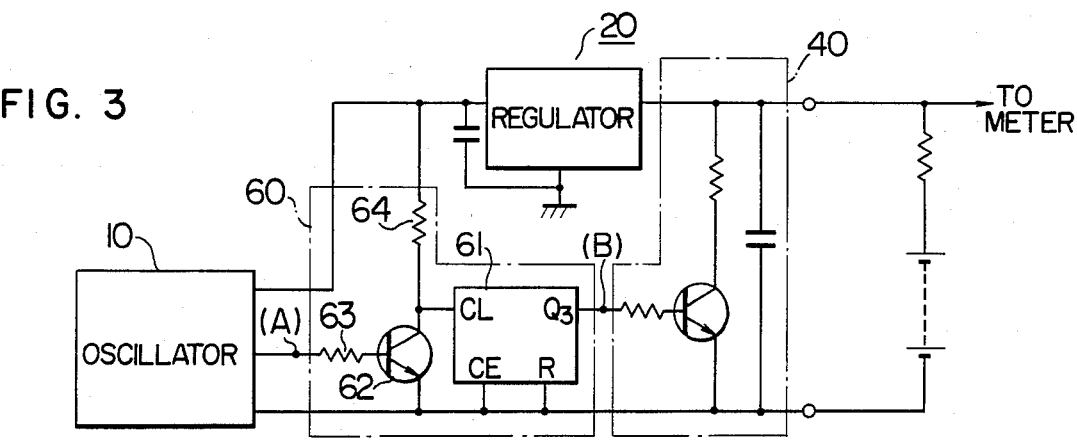
FIG. 3 is an electrical wiring diagram showing another embodiment of the system according to the present invention.
Figure 4:
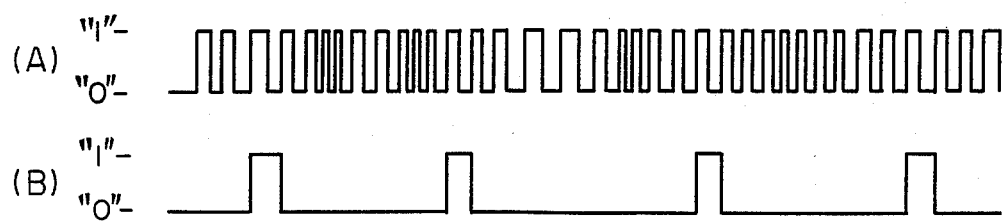
FIG. 4 shows voltage waveforms produced at various parts of the circuit of FIG. 3.

In the aforementioned embodiment, the one-shot multivibrator 30 is for generating a pulse signal sufficiently short in pulse duration as compared with the oscillation frequency-signal produced from the oscillator section 10. This one-shot multivibrator 30 may be replaced with equal effect by a pulse generator circuit 60 shown in FIG. 3 including a decimal counter 61 (such as TC4017 of Toshiba), a transistor 62 and resistors 63, 64. In this case, in response to the oscillation frequency-signal as shown in the waveform (A) of FIG. 4 applied from the oscillator section 10, a pulse is produced at the output terminal $Q_3$ of the decimal counter 61 at intervals of 10 applied pulses as shown in the waveform (B) and superimposed on the power line by the current converter circuit 40.

It will be understood from the foregoing description that according to the present invention, a pulse signal of a sufficiently short pulse duration is generated according to the oscillation frequency-signal of the oscillator, converted into a current changing signal whose leading edge portion is blunted by a capacitor and superimposed on power current through the power line. Thus an oscillation frequency-signal can be transmitted by causing a sufficient change of current in the power current but without reducing the voltage supplied to the oscillator section or without generating higher harmonics which might be otherwise generated by the signal superimposed on the power line.

We claim:

1. A frequency transmission system for transmitting a frequency signal, comprising:
    a d.c. battery;
    a pair of power supply lines connected to said d.c. battery;
    an oscillator connected to said battery through said power supply lines for generating a first train of pulse signals having a varying frequency;
    a pulse generator for generating a second train of pulse signals in synchronism with said first train of pulse signals, each of said second train of pulse signals having a pulse duration shorter than that of each of said first train of pulse signals;
    a switching element connected across said power supply lines for varying an electric current flowing through said power supply lines in synchronism with said second train of pulses; and
    a capacitor connected across said power supply lines in parallel relation to said switching element for blunting variations in said electric current.

2. A system according to claim 1, wherein said pulse generator includes a differentiator circuit for differentiating said first train of pulse signals to produce said second train of pulse signals.

3. A system according to claim 2, wherein said differentiator circuit comprises
    a capacitor,
    first diode and resistor connected in series between said power supply lines, and
    a second diode connected between the other terminal of said capacitor and said one of said lines.

* * * * *